United States Patent
Buchberger et al.

(10) Patent No.: US 7,528,085 B2
(45) Date of Patent: May 5, 2009

(54) FIRED REFRACTORY CERAMIC PRODUCT AND A BATCH FOR THE PRODUCTION THEREOF

(75) Inventors: Bernd Buchberger, Trofaiach (AT); Roland Nilica, Leoben (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 281 days.

(21) Appl. No.: 10/597,530

(22) PCT Filed: Jan. 19, 2005

(86) PCT No.: PCT/EP2005/000460

§ 371 (c)(1), (2), (4) Date: Jul. 28, 2006

(87) PCT Pub. No.: WO2005/080293

PCT Pub. Date: Sep. 1, 2005

(65) Prior Publication Data

US 2008/0254967 A1    Oct. 16, 2008

(30) Foreign Application Priority Data

Feb. 13, 2004    (DE) ............... 10 2004 007 062

(51) Int. Cl.
*C04B 35/443* (2006.01)
*C04B 35/20* (2006.01)

(52) U.S. Cl. ...................... 501/120; 501/122

(58) Field of Classification Search ............. 501/120, 501/122

See application file for complete search history.

(56) References Cited

U.S. PATENT DOCUMENTS

| 2,045,494 A | 6/1936 | Riddle |
| 3,060,040 A | 10/1962 | Bristow |
| 6,982,233 B2 * | 1/2006 | Buchberger et al. ......... 501/120 |

FOREIGN PATENT DOCUMENTS

| EP | 0 122 572 A2 | | 10/1984 |
| JP | 48 034809 B | | 1/1973 |
| JP | 07048167 | * | 2/1995 |
| SU | 1330114 | * | 8/1987 |
| SU | 1266122 | * | 11/1987 |
| SU | 1719360 | * | 3/1992 |

OTHER PUBLICATIONS

Zawrah, M. F. M., "Effect of $Cr_2O_3$ on sinterability and properties of mullite-spinel composites", British Ceramic Transactions Inst. Matter UK, vol. 102, No. 3, Jun. 2003, pp. 114-118.

* cited by examiner

*Primary Examiner*—Karl E Group
(74) *Attorney, Agent, or Firm*—Christopher L. Parmelee; Walker & Jocke LPA

(57) ABSTRACT

The invention relates to a fired refractory ceramic product and a batch that can be used to produce said product. Both the batch (the mixture) and the prepared fired product contain spinels consisting of MgO and $Al_2O_3$.

3 Claims, 2 Drawing Sheets

US 7,528,085 B2

FIRED REFRACTORY CERAMIC PRODUCT AND A BATCH FOR THE PRODUCTION THEREOF

The invention relates to a burnt, refractory, ceramic product and a mixture (batch) with which the product can be manufactured. Both the mixture and the finished, burnt product make use of spinels of MgO and $Al_2O_3$ (referred to in the following as MA spinel).

Numerous spinels are suitable for the manufacture of refractory products. They can be manufactured synthetically as sinter spinel (e.g. by sintering in rotary kilns or cupola furnaces) or as fused spinel (e.g. in an electric arc furnace).

Magnesia spinel bricks consist mineralogically essentially of periclase (MgO) and MA spinel (MgO—$Al_2O_3$) and comprise at least 40% by weight of MgO. The MA spinel can either be added pre-synthesised or it is formed during the "in situ" burning from MgO and $Al_2O_3$ additives (DE 36 17 904 C2).

Burnt spinel products with stoichiometrically composed MA spinel have in most cases better refractory properties, in particular improved resistance to slags, than products with non-stoichiometrically composed spinel. The stoichiometric proportions of an MA spinel, calculated to an accuracy of 2 decimal places, are 28.33% by weight of MgO and 71.67% by weight of $Al_2O_3$. Within the scope of the invention, however, all the compositions which deviate from the above-mentioned, exact stoichiometric composition by plus/minus 0.5% by weight absolute per component, are covered by the term "stoichiometric MA spinel", to take account of the industrially technical possibilities. Even with this convention it is extremely difficult to manufacture stoichiometrically composed MA spinels so that they can be industrially reproduced.

However, products with extremely high quality requirements and having improved resistance to aggressive slags are in increasing demand on the market. For example, when liquors from the paper industry are gasified in a so-called black liquor gasifier, organic components are burnt, whilst a mixture of highly alkaline salts remains in the reactor and acts on the refractory material of the reactor lining. With conventional, fusion cast refractory products based on ad corundum, there is rapid wear due to corrosion and volume expansion. Known magnesia bricks are highly infiltrated by the slag.

The object of the invention is to make available a product which can be manufactured industrially reproducibly in a good quality, and which also has a high resistance to aggressive slags of the type mentioned.

The invention is based on the following consideration:

A non-stoichiometrically composed spinel, in particular a spinel with an MgO content exceeding that of a stoichiometric spinel, forms the essential batch component. This MA spinel will be converted during burning (firing) for manufacturing the refractory product to an essentially stoichiometrically composed spinel. For this purpose further components must be added to the mixture, which components react with the super-stoichiometric MgO proportion of the MA spinel during burning and therefore reduce the MgO proportion of the mixture spinel to the stoichiometric range.

Mullite ($3Al_2O_3 \times 2SiO_2$) is proposed as such a further component.

Figure 1:
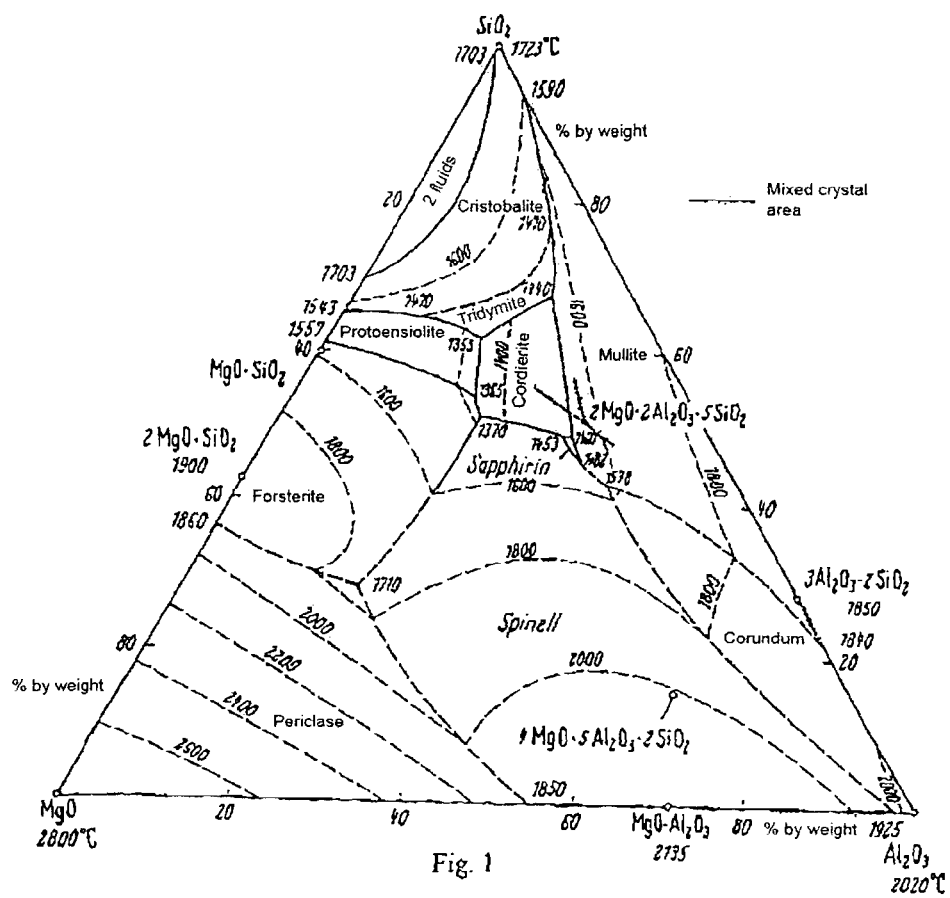
FIG. 1 shows a three substance system MgO—$Al_2O_3$—$SiO_2$.

The behaviour of the refractory ceramic product formed from these components (MgO-rich MA spinel and mullite) during burning can be discussed on the basis of the three-substance system MgO—$Al_2O_3$—$SiO_2$, which is shown in FIG. 1.

The composition of the mixture of a non-stoichiometric, MgO-rich spinel and mullite shows an imaginary line which runs between the composition of the spinel, i.e. between MgO and MgO×$Al_2O_3$ and the mullite composition, i.e. $3Al_2O_3 \times 2SiO_2$.

The conditions prevailing during burning of the mixture for the refractory product should be controlled so that the ternary eutectic can be obtained at approx. 1710° C. For this purpose provision is made for the composition of the mixture to be selected from within the co-node triangle periclase (MgO)-MA spinel-forsterite ($2MgO \times SiO_2$).

In the case of the above-mentioned eutectic stoichiometrically composed spinel, forsterite and periclase are in equilibrium with each other.

The MgO present super-stoichiometrically is transformed into periclase.

Intermediate melting phases, during sintering, are essential for the reaction to take place inside the mixture during burning and sintering of the mixture components. These melting phases enable dense sintered products to be obtained which may account for over 90% of the theoretical pure substance density of the product. The melting phases are important for the fire resistance of the burnt product because they are converted to high melting compounds during burning, and particularly during sintering.

A composition may be produced in the immediate vicinity of a mullite grain of the mixture which deviates from the average composition of the system. This may give rise to local compositions with a melting temperature of below 1710° C., for example in the range of the eutectic at 1365° C. Above this temperature melting phases may take place in these areas. The different compositions are balanced as a result of diffusion processes. The compositions deviating locally from the average composition of the system vary on the imaginary line between non-stoichiometric, MgO-rich initial spinel and mullite in the direction of the average composition of the system. This balancing reaction is facilitated by liquid phases that are formed.

Mullite can be used, for example, as sinter mullite or fused mullite. It is important that the mullite be at least partially added to the mixture as such and is formed at most partially, during firing of the mixture to produce a refractory product. The mullite proportion of the mixture is between 2 and 30% by weight, e.g. with lower limit values of 2 or 3 or 4% by weight and upper limits of 6 or 7 or 10% by weight.

The proportion of MA spinel with MgO excess is 70-98% by weight of the mixture, e.g. 80-98% by weight, 85-98% by weight or 92-96% by weight. The MgO proportion in the non-stoichiometric spinel may, for example, be as much as 40% by weight, e.g. with a lower limit of 29, 30, 31 or 32% by weight and an upper limit of between 33 and 36% by weight. An industrially produced, non-stoichiometric spinel is indicated as an example below, in terms of its composition:

| | |
|---|---|
| MgO: | 31.9% by weight |
| Al₂O₃: | 67.5% by weight |
| CaO: | 0.25% by weight |
| Fe₂O₃: | 0.20% by weight |
| Na₂O: | 0.15% by weight |
| | 100.00% by weight |

The mixture may contain secondary constituents, e.g. $Fe_2O_3$, $CaO_2$, $SiO_2$, $Na_2O$ or $K_2O$, possibly in the form of contaminants. None of these constituents should exceed 2% by weight. The sum of the secondary constituents, particularly oxides, is <5% by weight.

In addition to spinel and mullite, the mixture may also contain $ZrO_2$ or a component containing $ZrO_2$. The zirconium dioxide added to the mixture is hardly influenced by the reactions taking place inside the predetermined three-substance system. However, improved structure elasticity of the burnt product (with $ZrO_2$ addition) may be obtained by addition and micro-crack formation. Synthetically extracted or naturally occurring $ZrO_2$ (Baddeleyite) may be used as the zirconium dioxide component. The proportion of the total mixture may be between 1 and 10% by weight, e.g. with lower limit values of 1, 2 or 3% by weight and upper limit values of 5, 6 or 7% by weight.

A method for preparing a mixture according to the invention is indicated in the following by way of example:

The MgO-rich MA spinel is first crushed, e.g. in an oscillating mill. After crushing, the spinel may be present in the following grain sizes:

| | |
|---|---|
| $d_{10}$: | 0.9 μm |
| $d_{50}$: | 4.6 μm |
| $d_{90}$: | 14.1 μm. |

In all cases a grain size <50 μm is preferred, more preferably <30 μm.

The spinel is then mixed with sinter mullite and crushed together in the ball mill. The proportions of the components in the mixture may be set as follows:

non-stoichiometric, MgO-rich MA spinel: 93-97% by weight
sinter mullite: 3-7% by weight
others: up to 4% by weight.

The mixture is then mixed with a bonding agent, e.g. 0.2-3 parts by weight of polyvinyl alcohol to 100 parts by weight of the aforementioned mixture, and granulated in a fluidised bed granulator. The moisture content of the granules (average diameter approx. 1-5 mm) may be between 1 and 2% by weight related to the total mixture.

The granules are then pressed into the desired shape and the so formed workpiece is dried. Finally the pressed products are burnt at approx. 1700° C. (sintered), during which the above-mentioned reactions take place.

The burnt product has the following composition, taking the above-mentioned mixture as an example:

| Component | % by weight |
|---|---|
| stoichiometric MA spinel | 94.5 |
| periclase | 3.0 |
| forsterite | 2.5 |

With a density of 3.37 g/cm³, the product accounts for over 94% of the theoretical density of 3.58 g/cm³.

Generally the burnt product may have a proportion of stoichiometric spinel of between 70 and 98% by weight, with typical lower limits of between 70-85% by weight and typical upper limits of between 90-98% by weight or 90-96% by weight.

The proportion of forsterite in the burnt product is, for example, between 1-15% by weight, e.g. 1-7% by weight, 1.5-4% by weight or 1-5% by weight.

The proportion of periclase in the burnt product may be indicated as 1-15% by weight, e.g. 1-8% by weight, 3-7% by weight or 2-5% by weight.

Any ZrO2 proportion in the burnt product (from the mixture or from contaminants in the manufacturing process) may be 1-10% by weight, e.g. 1-7% by weight or 2-5% by weight.

CaO contaminations (e.g. from the initial spinel used) may result in Ca—Al oxides (such as $CaAl_2O_4$, abbreviated to: CA) in the burnt product. Other Ca—Al oxides may be: "$C_2A$", "$CA_2$", "$C_3A$", "$C_{12}A_7$" and/or "$CA_6$".

Figure 2:
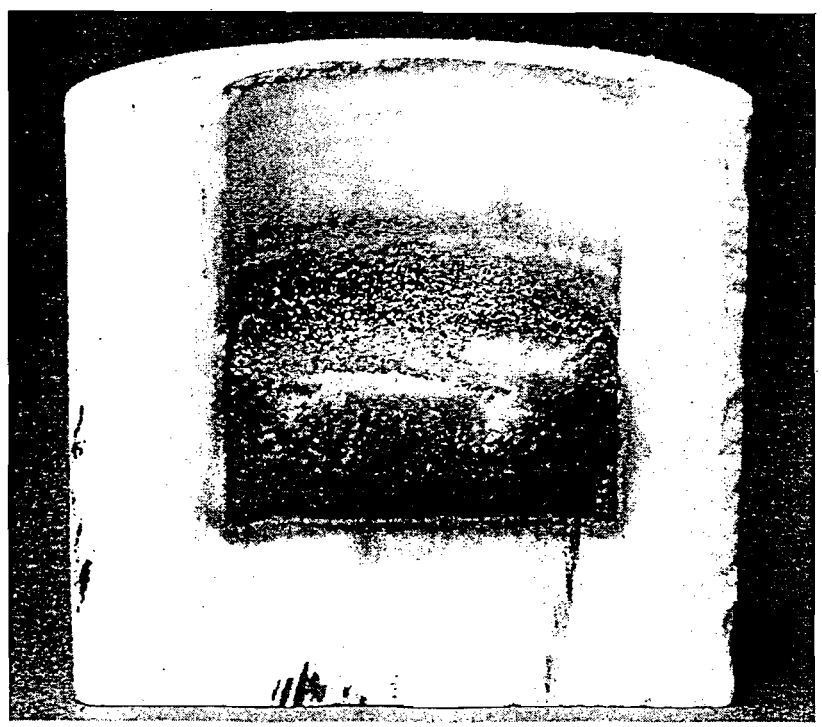
FIG. 2 shows a Crucible A that consists of a material according to the invention.
Figure 3:
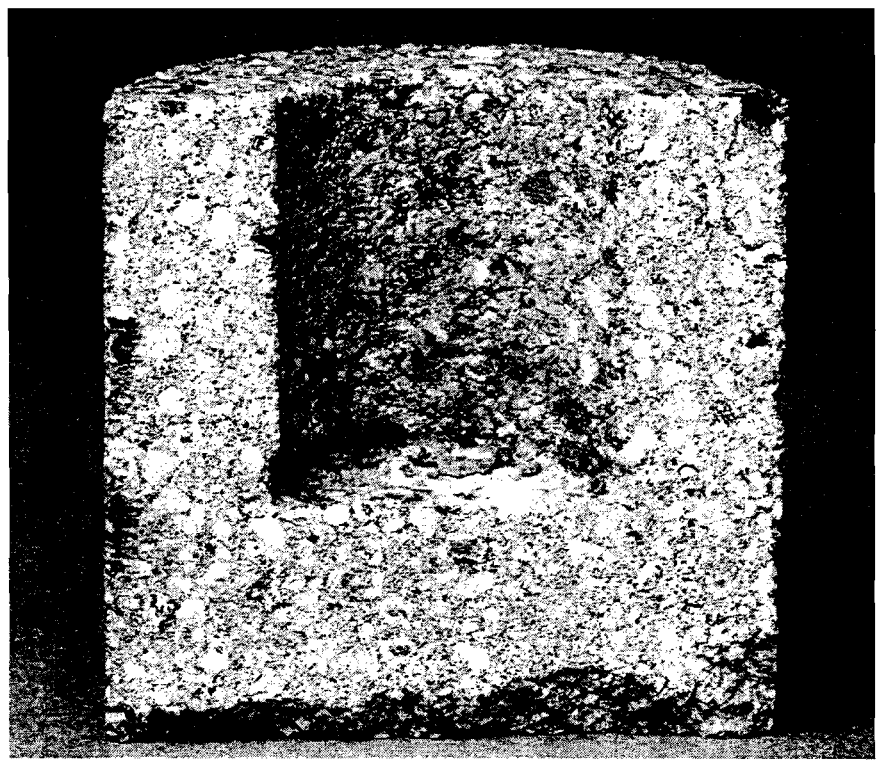
FIG. 3 shows a Crucible B that consists of conventional corundum-mullite quality.
Figure 4:
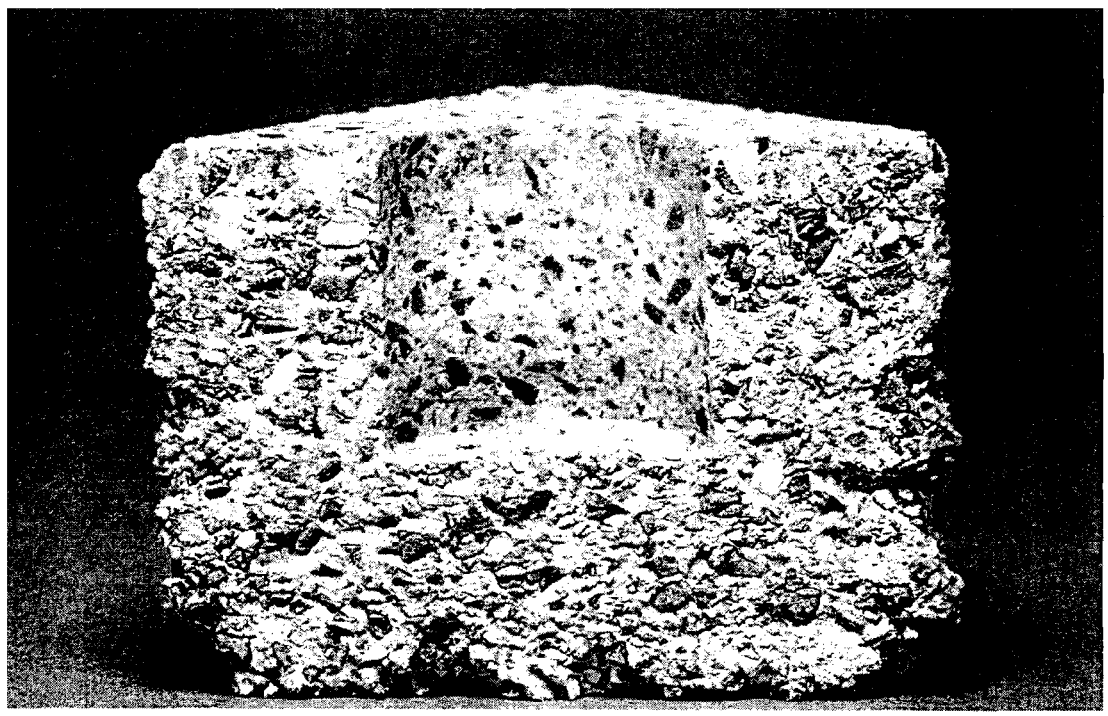
FIG. 4 shows a Crucible C that consists of MgO + spinel.

The superiority of the product according to the invention compared with products of prior art is shown in FIGS. 2-4.

Crucibles of the same structure were filled with the same quantity of slag from a black-liquor gasifying plant and loaded thermally under the same conditions at 1100° C. for 48 hours.

Crucible A (FIG. 2) consists of a material according to the invention. It is largely crack-free. The infiltration is minimal, and no change in shape has taken place.

Crucible B (FIG. 3) consists of a conventional corundum-mullite quality. Complete slag infiltration into the crucible structure can be seen.

The material of crucible C (FIG. 4) consists of MgO+ spinel. The crucible is quasi "swollen" due to the formation of β-corundum during the experiment. The slag has fully infiltrated the crucible.

The invention claimed is:

1. A burnt refractory ceramic product with the following mineralogical phases:

a) 70-98% by weight of a stoichiometric MgO—Al₂O₃ spinel,
b) 1-15% by weight of forsterite,
c) 1-15% by weight of periclase,
d) Up to 10% by weight of other,
wherein the total is 100% by weight.

2. The product according to claim 1, with the following mineralogical phases:

e) 70-97% by weight of a stoichiometric MgO—Al₂O₃ spinel,
f) 1-10% by weight of forsterite,
g) 1-10% by weight of periclase,
h) 1-10% by weight of ZrO₂ and/or at least one Ca—Al oxide phase,
wherein the total is 100% by weight.

3. The product according to claim 1, with a density >3.35 g/cm³.

* * * * *